(No Model.)
J. DOUGLASS.
HARNESS SADDLE.
No. 339,628. Patented Apr. 13, 1886.
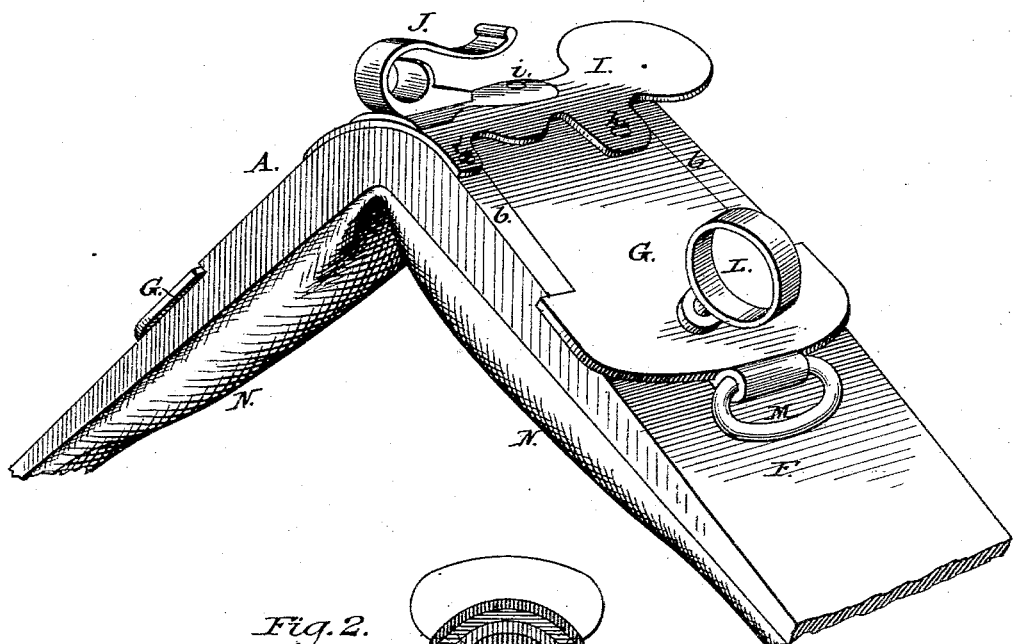
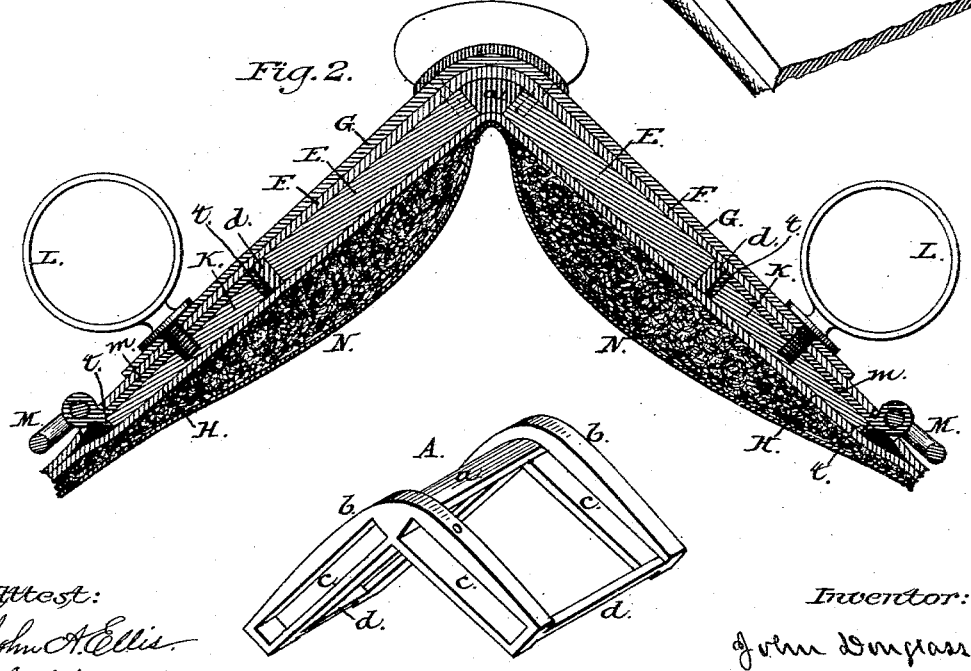
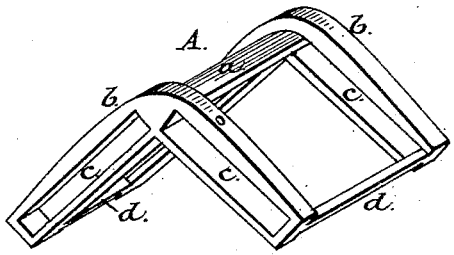
Attest:
John A. Ellis
A. B. Moore
Inventor:
John Douglass
By David A. Burr
Atty.

United States Patent Office.

JOHN DOUGLASS, OF BROOKLYN, NEW YORK.

HARNESS-SADDLE.

SPECIFICATION forming part of Letters Patent No. 339,628, dated April 13, 1886.

Application filed August 24, 1885. Serial No. 175,157. (No model.)

*To all whom it may concern:*

Be it known that I, JOHN DOUGLASS, of the city of Brooklyn, in the county of Kings and State of New York, have invented a new and useful Improvement in Harness Saddles and Trees; and I do hereby declare that the following is a full and exact description thereof, reference being had to the accompanying drawings, and to the letters of reference marked thereon, making a part of this specification.

My invention relates to harness-saddles and the trees for the same, and has for its object the construction of a tree and saddle which may not spread nor in any wise injure the horse's back.

In harness-saddle trees now generally in use the tree is apt to spread by reason of the constant tension of the shafts thereon, and when it has spread, or for other reason does not properly fit the animal's back, it produces wounds by reason of the projection from its under side of the nuts or ends of the bolts and screws by which the check-hooks and terrets are secured to the tree. My invention obviates these defects in the ordinary trees.

In the accompanying drawings, Figure 1 is a view in perspective of my improved harness-saddle; Fig. 2, a central transverse section of the same, and Fig. 3 a view in perspective of the metal tree for the saddle with all trimmings removed.

A represents my improved saddle-tree, which consists of a metallic frame constructed with a longitudinal ridge-piece, $a$, connecting the apices of two angular end pieces, $b\ b$, each of which is longitudinally slotted, as at $c\ c$, Fig. 3, and whose outer ends on each side are connected by longitudinal bars $d\ d$. The slots $c\ c$ serve to receive and confine the ends of side boards, E E, (see Fig. 2,) which complete the tree. The bars $d\ d$, as well as the ridge-piece $a$, are of a width corresponding to that of the slots $c\ c$, so that the faces of the side boards, E E, fitted in these slots, are flush with the faces of the side bars and ridge-piece. The coverings of flap-leather F and jockey-leather G are laid over the ridge-piece $a$ and over the side boards, E E, and made of a width to fill in the recesses between the end pieces, $b\ b$, on each side of the tree, leaving the outer faces of said end pieces exposed for ornamental effect. The under side of the tree is in like manner covered by the pad-leathers H, which are firmly secured to the tree by wood-screws entering the wooden side boards, E E. The metallic saddle-plate I and the check-hook J, resting thereon, are also secured upon the covered tree by means of wood-screws $h\ h$ and machine-screws $i\ i$. The screws $h\ h$, passing through the superimposed leather, enter the wooden plates E E, and the machine-screws $i\ i$ enter threaded apertures in the frame of the tree. A second flap-board, K, Fig. 2, equal in length to the tree-board E, is inserted and secured between the projecting ends of the pad H and flap-leather F, the two thicknesses of leather forming a hinged joint between the boards F and K, which permits the flap-board K to adjust itself neatly to the horse's back. The terret L and back-band loop M are secured to this flap-board K. The plate $m$ of the back-band loop is formed with parallel lips $t\ t$ (see Fig. 2) to project from its inner end and from its inner face at a suitable distance from said end, so as to embrace and clamp between them the edges of the flap-board K, to which it is directly secured by wood-screws, the loop M being made to project outwardly from the lower edge of the jockey G through a slit in the covering-leather F. The stem of the terret L is made to screw through the jockey, the covering-leather, and a central threaded aperture in the plate $m$ of the back-band loop into the wooden flap-board K. The saddle is finished by securing thereto the customary cushions or pads N N.

In a saddle thus constructed the tree is so rigid as that it will retain permanently its original form, and cannot spread so as to drop upon the backbone of the horse. Its under side is entirely smooth and free from nuts, screw ends, or other projections or protuberances which may in any manner wound or hurt the animal or wear out the pads. Its hinged flaps permit the saddle to adjust itself comfortably and neatly to the shape of the horse's back, while the attachment of the check-hook, terrets, and back-band loops to the tree and saddle is very firm and secure.

I claim as my invention—

1. The harness-saddle-tree frame A, constructed of two slotted angular end pieces, $b\ b$, united centrally by an interposed ridge-piece, a, and at their ends by parallel bars d d, substantially in the manner and for the purpose herein set forth.

2. The combination, with the slotted angular end pieces, b b, connecting ridge-piece a, and lateral bars d d, constituting the frame of the saddle-tree, of wooden side plates, E, fitted between the side bars and ridge-piece and having their ends inserted and secured within the slots of the end pieces, substantially in the manner and for the purpose herein set forth.

3. The combination, with the metallic frame and wooden side plates of the saddle-tree A, constructed substantially as described, of the covering-leather F and pad-leather H, extending laterally beyond the side bars, d d, of the frame, and the separate lateral flap-boards K K, inserted and secured between the projecting ends of said covering and pad leathers and held thereby against said side bars, d d, substantially in the manner and for the purpose herein set forth.

4. The combination, with each of the separate lateral flap-boards secured to the edges of the saddle-tree by its covering and pad leathers, of a plate carrying the back-band loop secured to the board and provided with lips to engage and clamp between them its edges, substantially in the manner and for the purpose herein set forth.

In testimony whereof I have signed my name to this specification in the presence of two subscribing witnesses.

JOHN DOUGLASS.

Witnesses:
  HENRY JONES,
  FRANK JONES.